United States Patent
Kawamura et al.

(10) Patent No.: US 11,512,951 B2
(45) Date of Patent: Nov. 29, 2022

(54) MEASURING JIG FOR ROTARY MACHINE AND MEMBER MANAGEMENT METHOD FOR ROTARY MACHINE

(71) Applicant: MITSUBISHI HEAVY INDUSTRIES COMPRESSOR CORPORATION, Tokyo (JP)

(72) Inventors: Yasuhiko Kawamura, Hiroshima (JP); Kyoichi Ikeno, Hiroshima (JP); Yuzo Tsurusaki, Hiroshima (JP); Yuichi Sasaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/228,015

(22) Filed: Apr. 12, 2021

(65) Prior Publication Data
US 2021/0325177 A1   Oct. 21, 2021

(30) Foreign Application Priority Data

Apr. 17, 2020   (JP) .............................. JP2020-074016

(51) Int. Cl.
*G01B 21/16*   (2006.01)
*F01D 25/24*   (2006.01)

(52) U.S. Cl.
CPC .............. *G01B 21/16* (2013.01); *F01D 25/24* (2013.01)

(58) Field of Classification Search
CPC ................................. G01B 21/16; F01D 25/24
See application file for complete search history.

(56) References Cited

U.S. PATENT DOCUMENTS

| 9,964,393 B2 * | 5/2018 | Waki ...................... F01D 25/285 |
| 2010/0241394 A1 * | 9/2010 | Ihara ...................... G01B 21/24 |
| | | 702/151 |
| 2019/0072108 A1 * | 3/2019 | Yamada ................ F04D 29/628 |

FOREIGN PATENT DOCUMENTS

| JP | 2003-269951 A | 9/2003 |
| JP | 2007032504 A | * 2/2007 |

(Continued)

OTHER PUBLICATIONS

Machine translation of WO2013021515A (Year: 2013).*

(Continued)

*Primary Examiner* — Douglas X Rodriguez
*Assistant Examiner* — Sangkyung Lee
(74) *Attorney, Agent, or Firm* — Osha Bergman Watanabe & Burton LLP

(57) ABSTRACT

The measuring jig for the rotary machine is a measuring jig for a rotary machine including a casing that extending about an axis, a rotor that is disposed in the casing and extends in an axial direction about the axis, and a plurality of bearings that are disposed at intervals in the axial direction and supports the rotor in the casing. The measuring jig includes a plurality of casing fixing portions that are respectively attachable to and detachable from bearing holding portions to which the bearings are attached in the casing; a main member that extends in the axial direction so as to connect the plurality of casing fixing portions to each other; an arm that extends from the main member in an orthogonal direction orthogonal to the axial direction; and a reference surface that is disposed at a distance from a measurement target part of the casing.

6 Claims, 8 Drawing Sheets

(56) References Cited

FOREIGN PATENT DOCUMENTS

| JP | 2007-218117 A | | 8/2007 | |
|---|---|---|---|---|
| JP | 3959319 B2 | * | 8/2007 | |
| JP | 2014187785 A | * | 10/2014 | |
| WO | WO-2013021515 A1 | * | 2/2013 | ............. F04D 17/12 |

OTHER PUBLICATIONS

Machine translation of JP2014187785A (Year: 2014).*
Machine translation of JP2007032504A (Year: 2007).*
Machine translation of JP3959319B2 (Year: 2007).*

* cited by examiner

MEASURING JIG FOR ROTARY MACHINE AND MEMBER MANAGEMENT METHOD FOR ROTARY MACHINE

BACKGROUND OF THE INVENTION

Field of the Invention

The present disclosure relates to a measuring jig for a rotary machine and a member management method for the rotary machine.

Priority is claimed on Japanese Patent Application No. 2020-074016, filed on Apr. 17, 2020, the contents of which are incorporated herein by reference.

Description of Related Art

In rotary machines such as turbines and compressors, a rotor is rotatably disposed in a casing via bearings. Such rotary machines are required to be assembled with high accuracy. For this reason, for example, Japanese Unexamined Patent Application, First Publication No. 2007-218117 discloses a configuration in which a jig is used for positioning a tail pipe in a step of assembling a gas turbine combustor. In this configuration, the work of positioning the tail pipe can be facilitated by using a jig.

SUMMARY OF THE INVENTION

Meanwhile, in the rotary machines, there is a case where the casing is deformed by heat after operation due to the influence of a working fluid flowing through the inside of each rotary machine. For that reason, in a case where the rotary machines are maintained after the operation, even when internal members such as the rotor are assembled to the casing after the maintenance, there is also a case where the clearances of the internal members with respect to the casing and stationary parts fixed to the casing cannot be appropriately secured as designed and the assembling itself becomes difficult. For this reason, a measuring instrument such as a lead wire or a plastic gauge is sandwiched between the casing and the stationary parts fixed to the casing, and the internal members, and the clearance is measured depending on the degree of collapse of the measuring instrument. However, substantial effort and cost are required for the measurement by such a method. For that reason, it is required to accurately and easily grasp the deformation of the casing.

The present disclosure provides a measuring jig for a rotary machine and a member management method for the rotary machine capable of accurately and easily grasping the deformation of a casing.

The measuring jig for the rotary machine according to the present disclosure is a measuring jig for a rotary machine including a casing that extending about an axis, a rotor that is disposed in the casing and extends in an axial direction about the axis, and a plurality of bearings that are disposed at intervals in the axial direction and is configured to support the rotor in the casing. The measuring jig includes a plurality of casing fixing portions that are configured to be respectively attachable to and detachable from bearing holding portions to which the plurality of bearings are attached in the casing; a main member that extends in the axial direction so as to connect the plurality of casing fixing portions to each other; an arm that extends from the main member in an orthogonal direction orthogonal to the axial direction; and a reference surface that is configured to disposed at a distance from a measurement target part of the casing.

The member management method for the rotary machine according to the present disclosure is a member management method using the measuring jig for the rotary machine as described above, the member management method including a step of measuring a distance between the measurement target part and the reference surface as a reference value after installing the measuring jig in the casing; a step of recording the measured reference value; a step of measuring a distance between the measurement target part and the reference surface as a measured value and installing the measuring jig in the casing after the step of recording the reference value; and a step of evaluating deformation of the casing on the basis of a difference between the measured value and the reference value.

According to the measuring jig for the rotary machine and the member management method for the rotary machine of the present disclosure, the deformation of the casing can be accurately and easily grasped.

DETAILED DESCRIPTION OF THE INVENTION

Hereinafter, an embodiment for carrying out a measuring jig for a rotary machine and a member management method for a rotary machine according to the present disclosure will be described with reference to the attached drawings. However, the present disclosure is not limited to the embodiment only.

(Configuration of Rotary Machine)

Figure 1:
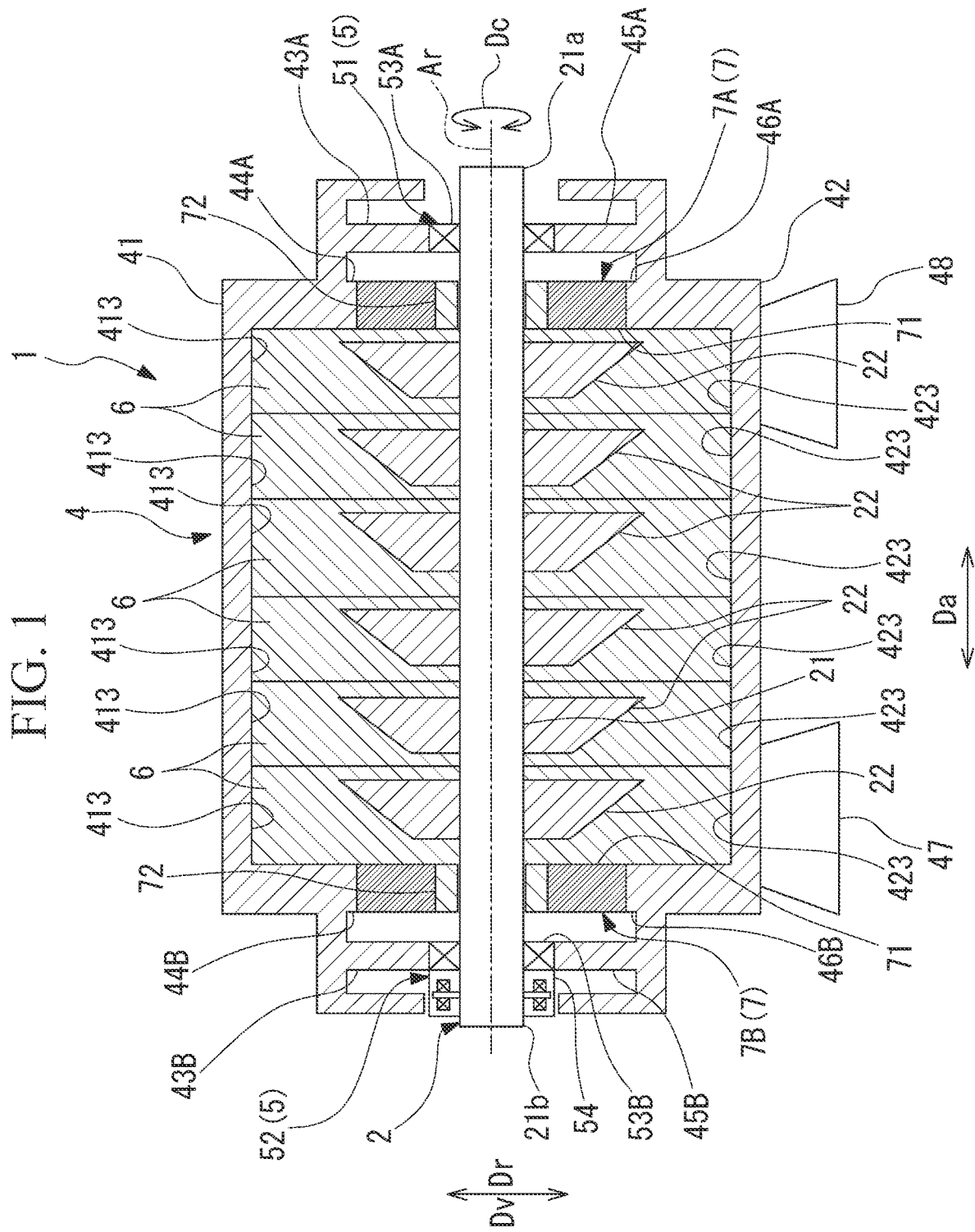
FIG. 1 is a sectional view illustrating a configuration of a measuring jig for a rotary machine according to the present embodiment and a rotary machine managed by using a member management method for a rotary machine.

First, the measuring jig for a rotary machine according to the present embodiment and a rotary machine that performs the member management method for a rotary machine will be described. As illustrated in FIG. 1, the rotary machine 1 mainly includes a rotor 2, a casing 4, a bearing portion 5, a diaphragm 6, and a seal portion 7. In the present embodiment, the rotary machine 1 is, for example, a multi-stage centrifugal compressor.

(Configuration of Rotor)

The rotor 2 is rotatable about an axis Ar in the casing 4. The rotor 2 includes a rotor body 21 and an impeller 22. The rotor body 21 extends in an axial direction Da about the axis Ar. The rotor body 21 is rotatably supported around the axis Ar by the bearing portion 5.

In addition, in the following, a direction in which the axis Ar extends is referred to as the axial direction Da. An orthogonal direction orthogonal to the axial direction Da is defined as a vertical direction Dv. That is, the axial direction Da in the rotary machine 1 is one in the horizontal direction. A surface orthogonal to the vertical direction Dv is the horizontal surface. The axial direction Da of the rotor body 21 is along the horizontal surface. A radial direction with reference to the axis Ar is simply defined as a radial direction Dr. A direction, which is orthogonal to the vertical direction Dv, in the radial direction Dr is defined as a width direction Dw, which is one of horizontal directions. Additionally, a direction around the rotor 2 centered on the axis Ar is defined as a circumferential direction Dc.

A plurality of impellers 22 are disposed at intervals in the axial direction Da. Each impeller 22 is fixed to the rotor body 21. Each impeller 22 is rotatable around the axis Ar integrally with the rotor body 21. In the present embodiment, for example, a total of six impellers 22 are provided.

In the present embodiment, an external shaft (not illustrated), which is rotationally driven around the axis Ar by another rotary machine (not illustrated) disposed outside the casing 4, is connected to a first end 21a of the rotor body 21.

In addition, the number of impellers 22 disposed on the rotor body 21 and the orientation of the impellers 22 are not limited to those provided as exemplary examples above and can be appropriately changed.

(Configuration of Casing)

The casing 4 has a tubular shape that extends in the axial direction Da about the axis Ar. The casing 4 is formed with a suction port 47 for guiding a working fluid into the casing 4 and a discharge port 48 for discharging the working fluid from the inside of the casing 4 to the outside. The casing 4 accommodates the rotor 2 inside together with a diaphragm 6. The casing 4 has an upper half casing 41 and a lower half casing 42 that are located above and below the axis Ar of the rotor 2 as a reference.

The upper half casing 41 extends in the circumferential direction Dc. The section of the upper half casing 41 orthogonal to the axis Ar has a semi-annular shape centered on the axis Ar. The upper half casing 41 is open downward in the vertical direction Dv so as to accommodate upper half portions of the rotor 2 and the diaphragm 6. The upper half casing 41 has an upper divided surface at both ends in the circumferential direction Dc. The upper divided surface of the upper half casing 41 is a horizontal surface that faces downward in the vertical direction Dv.

The upper half casing 41 has a first upper seal attachment portion 44A and a second upper seal attachment portion 44B, a first upper bearing holding portion 43A and a second upper bearing holding portion 43B, and an upper half diaphragm holding portion 413.

A seal portion 7 is attachable to each of the first upper seal attachment portion 44A and the second upper seal attachment portion 44B. Specifically, the first upper seal attachment portion 44A and the second upper seal attachment portion 44B are formed in a shape capable of covering an upper half portion of the seal portion 7. The first upper seal attachment portion 44A and the second upper seal attachment portion 44B are recessed to have a semicircular shape from the upper divided surface as viewed from the axial direction Da. The first upper seal attachment portion 44A is disposed at a position closer to the first end 21a of the rotor body 21 in the axial direction Da with respect to the plurality of impellers 22. The second upper seal attachment portion 44B is disposed at a position closer to a second end 21b of the rotor body 21 in the axial direction Da with respect to the plurality of impellers 22.

The bearing portion 5 is attachable to each of the first upper bearing holding portion 43A and the second upper bearing holding portion 43B. Specifically, the first upper bearing holding portion 43A and the second upper bearing holding portion 43B are formed in a shape capable of covering an upper half portion of the bearing portion 5. The first upper bearing holding portion 43A and the second upper bearing holding portion 43B are recessed to have a semicircular shape from the upper divided surface as viewed from the axial direction Da. The first upper bearing holding portion 43A is disposed at a position closer to the first end 21a in the axial direction Da with respect to the first upper seal attachment portion 44A. The second upper bearing holding portion 43B is disposed at a position closer to the second end 21b in the axial direction Da with respect to the second upper seal attachment portion 44B.

The diaphragm 6 is attachable to the upper half diaphragm holding portion 413. Specifically, the upper half diaphragm holding portion 413 is formed in a shape capable of covering an upper half portion of the diaphragm 6. The upper half diaphragm holding portion 413 is recessed to have a semicircular shape from the upper divided surface as viewed from the axial direction Da. The upper half diaphragm holding portion 413 is recessed larger than the first upper seal attachment portion 44A and the second upper seal attachment portion 44B and the first upper bearing holding portion 43A and the second upper bearing holding portion 43B. The upper half diaphragm holding portion 413 is formed at a position sandwiched between the first upper seal attachment portion 44A and the second upper seal attachment portion 44B in the axial direction Da. The number of upper half diaphragm holding portions 413 is formed by a number corresponding to the number of diaphragms 6.

The lower half casing 42 extends in the circumferential direction Dc. In the lower half casing 42, a section orthogonal to the axis Ar has a semi-annular shape centered on the axis Ar. The inner diameter of the lower half casing 42 is formed with the same size as the inner diameter of the upper half casing 41. The lower half casing 42 is open upward in the vertical direction Dv so as to accommodate lower half portions of the rotor 2 and the diaphragm 6. The lower half casing 42 has a lower half divided surface 421 (refer to FIG. 3) at both ends in the circumferential direction Dc. The lower half divided surface 421 of the lower half casing 42 is a horizontal surface that faces upward in the vertical direction Dv. The upper half casing 41 is placed above the vertical direction Dv with respect to the lower half casing 42. The upper half casing 41 and the lower half casing 42 are fixed to each other by fastening members such as bolts (not illustrated) in a state in which the upper divided surface (not illustrated) and the lower half divided surface 421 are in contact with each other. Accordingly, the casing 4 is formed.

The lower half casing 42 includes a first lower seal attachment portion 46A and a second lower seal attachment portion 46B, a first lower bearing holding portion 45A and a second lower bearing holding portion 45B, and a lower half diaphragm holding portion 423.

The seal portion 7 is attachable to the first lower seal attachment portion 46A and the second lower seal attachment portion 46B. The first lower seal attachment portion 46A and the second lower seal attachment portion 46B are formed in a shape capable of covering a lower half portion of the seal portion 7. The first lower seal attachment portion 46A and the second lower seal attachment portion 46B are recessed to have a semicircular shape from the lower half divided surfaces 421 as viewed from the axial direction Da. The first lower seal attachment portion 46A is disposed at a position closer to the first end 21a in the axial direction Da with respect to the plurality of impellers 22. The second lower seal attachment portion 46B is disposed at a position closer to the second end 21b in the axial direction Da with respect to the plurality of impellers 22.

The bearing portion 5 is attachable to the first lower bearing holding portion 45A and the second lower bearing holding portion 45B. The first lower bearing holding portion 45A and the second lower bearing holding portion 45B are formed in a shape capable of covering a lower half portion of the bearing portion 5. The first lower bearing holding portion 45A and the second lower bearing holding portion 45B are recessed in a semicircular shape from the lower half divided surfaces 421 as viewed from the axial direction Da. The first lower bearing holding portion 45A is disposed at a position closer to the first end 21a in the axial direction Da with respect to the first lower seal attachment portion 46A. The second lower bearing holding portion 45B is disposed at a position closer to the second end 21b in the axial direction Da with respect to the second lower seal attachment portion 46B.

The diaphragm 6 is attachable to the lower half diaphragm holding portion 423. Specifically, the lower half diaphragm holding portion 423 is formed in a shape capable of covering a lower half portion of the diaphragm 6. The lower half diaphragm holding portion 423 is recessed to have a semicircular shape from the lower half divided surfaces 421 as viewed from the axial direction Da. The lower half diaphragm holding portion 423 is recessed larger than the first lower seal attachment portion 46A and the second lower seal attachment portion 46B and the first lower bearing holding portion 45A and the second lower bearing holding portion 45B. The lower half diaphragm holding portion 423 is formed at a position sandwiched between the first lower seal attachment portion 46A and the second lower seal attachment portion 46B in the axial direction Da. The number of lower half diaphragm holding portions 423 is formed in a number corresponding to the number of diaphragms 6. That is, the lower half diaphragm holding portion 423 is formed by the same number as the upper half diaphragm holding portion 413.

(Configuration of Diaphragm)

The diaphragm 6 is disposed outside the rotor body 21 in the radial direction Dr. A plurality of the diaphragms 6 are disposed side by side in the axial direction Da so as to correspond to the impellers 22, respectively. The diaphragm 6 has an annular shape centered on the axis Ar. An upper half portion of the annular diaphragm 6 is fixed to the upper half diaphragm holding portion 413 in a state of being accommodated inside the upper half casing 41. A lower half portion of the annular diaphragm 6 is fixed to the lower half diaphragm holding portion 423 in a state of being accommodated inside the lower half casing 42. Specifically, an outer peripheral surface of the upper half portion of the diaphragm 6 is accommodated inside the upper half casing 41 in a state of facing an inner peripheral surface of the upper half casing 41 that forms the upper half diaphragm holding portion 413. An outer peripheral surface of the lower half portion of the diaphragm 6 is accommodated inside the lower half casing 42 in a state of facing an inner peripheral surface of the lower half casing 42 that forms the lower half diaphragm holding portion 423.

(Configuration of Bearing Portion)

The bearing portion 5 rotatably supports the rotor body 21 about the axis Ar. The bearing portion 5 is disposed inside the casing 4. The bearing portion 5 has a first bearing portion 51 and a second bearing portion 52.

The first bearing portion 51 supports the rotor body 21 on the first end 21a side in the axial direction Da with respect to the plurality of impellers 22. The first bearing portion 51 has a journal bearing (bearing) 53A. The journal bearing 53A receives a load that acts on the rotor body 21 in the radial direction Dr. The first bearing portion 51 is held by the first upper bearing holding portion 43A of the upper half casing 41 and the first lower bearing holding portion 45A of the lower half casing 42. Specifically, an upper half portion of the first bearing portion 51 formed in an annular shape is fixed to the first upper bearing holding portion 43A in a state of being accommodated inside the upper half casing 41. A lower half portion of the first bearing portion 51 is fixed to the first upper bearing holding portion 43A in a state of being accommodated inside the lower half casing 42. More specifically, an outer peripheral surface of the upper half portion of the first bearing portion 51 is accommodated inside the upper half casing 41 in a state of facing the inner peripheral surface of the upper half casing 41 forming the first upper bearing holding portion 43A. An outer peripheral surface of the lower half portion of the first bearing portion 51 is accommodated inside the lower half casing 42 in a state of facing the inner peripheral surface of the lower-half casing 42 that forms the first upper bearing holding portion 43A.

The second bearing portion 52 supports the rotor body 21 on the second end 21b side in the axial direction Da with respect to the plurality of impellers 22. The second bearing portion 52 has a journal bearing (bearing) 53B and a thrust bearing 54. The journal bearing 53B receives a load that acts on the rotor body 21 in the radial direction Dr. The thrust bearing 54 receives a load that acts on the rotor body 21 in the axial direction Da via a thrust disc. The second bearing portion 52 is held by the second upper bearing holding portion 43B of the upper half casing 41 and the second lower bearing holding portion 45B of the lower half casing 42. Specifically, an upper half portion of the second bearing portion 52 formed in an annular shape is fixed to the second upper bearing holding portion 43B in a state of being accommodated inside the upper half casing 41. A lower half portion of the second bearing portion 52 is fixed to the second lower bearing holding portion 45B in a state of being accommodated inside the lower half casing 42. More specifically, an outer peripheral surface of the upper half portion of the second bearing portion 52 is accommodated inside the upper half casing 41 in a state of facing the inner peripheral surface of the upper half casing 41 that forms the second upper bearing holding portion 43B. The outer peripheral surface of the lower half portion of the second bearing portion 52 is accommodated inside the lower half casing 42 in a state of facing the inner peripheral surface of the lower half casing 42 that forms the second lower bearing holding portion 45B.

(Configuration of Seal Portion)

The seal portion 7 seals a gap between the rotor 2 and the casing 4. The seal portion 7 suppresses the outflow of the working fluid from the gap between the rotor 2 and the casing 4 to the outside of the casing 4 and the entering of foreign matter or the like from the outside into the casing 4. The seal portions 7 are disposed at intervals in the axial direction Da so as to sandwich the plurality of impellers 22. The seal portion 7 includes a first seal portion 7A on the first end 21a side and a second seal portion 7B on the second end 21b side. The first seal portion 7A and the second seal portion 7B each include a support ring 71 and a seal member 72.

The support ring 71 extends in the circumferential direction Dc. The support ring 71 has a circular through-hole formed at a central portion as viewed from the axial direction Da. That is, the support ring 71 has an annular shape. The support ring 71 of the first seal portion 7A is held by the first upper seal attachment portion 44A of the upper half casing 41 and the first lower seal attachment portion 46A of the lower half casing 42. Additionally, the support ring 71 of the second seal portion 7B is held by the second upper seal attachment portion 44B of the upper half casing 41 and the second lower seal attachment portion 46B of the lower half casing 42. Specifically, an upper half portion of the support ring 71 formed in an annular shape is fixed to the first upper seal attachment portion 44A and the second upper seal attachment portion 44B in a state of being accommodated inside the upper half casing 41. A lower half portion of the support ring 71 is fixed to the first lower seal attachment portion 46A and the second lower seal attachment portion 46B in a state of being accommodated inside the lower half casing 42. More specifically, an outer peripheral surface of the upper half portion of the support ring 71 is accommodated inside the upper half casing 41 in a state of facing an inner peripheral surface of the upper half casing 41 that forms the first upper seal attachment portion 44A and the second upper seal attachment portion 44B. An outer peripheral surface of the lower half portion of the support ring 71 is accommodated inside the lower half casing 42 in a state of facing an inner peripheral surface of the lower half casing 42 that forms the first lower seal attachment portion 46A and the second lower seal attachment portion 46B.

The seal member 72 is disposed inside the support ring 71 in the radial direction Dr. The seal member 72 is provided between an inner peripheral surface of the support ring 71 and an outer peripheral surface of the rotor body 21. The seal member 72 is fixed to the support ring 71 with a clearance between the seal member 72 and the outer peripheral surface of the rotor body 21. The seal member 72 is, for example, a dry gas seal, a labyrinth seal, or the like.

(Configuration of Measuring Jig for Rotary Machine)

Next, a measuring jig 100 for a rotary machine will be described. As illustrated in FIGS. 2 to 6, the measuring jig 100 is used in a state in which the internal members of the rotor 2, the bearing portion 5, the diaphragm 6, and the seal portion 7 are removed from the upper half casing 41 and the lower half casing 42. The measuring jig 100 is used for measuring the deformation of at least one of the upper half casing 41 and the lower half casing 42 due to heat or the like. In the present embodiment, the measuring jig 100 used for the measurement of the lower half casing 42 will be described as an example, but a measuring jig used for the measurement of the upper half casing 41 also has the same structure. The measuring jig 100 includes a plurality of casing fixing portions 102, a main member 101, a plurality of arms 103, and a plurality of measurement reference members 104. The plurality of casing fixing portions 102, the main member 101, the plurality of arms 103, and the plurality of measurement reference members 104 are integrally formed so as to be immovable from each other.

The casing fixing portions 102 are attachable to and detachable from the first lower bearing holding portion 45A and the second lower bearing holding portion 45B, which are the bearing holding portions of the lower half casing 42, respectively. The plurality of casing fixing portions 102 of the present embodiment include a first casing fixing portion 102A and a second casing fixing portion 102B.

Figure 3:
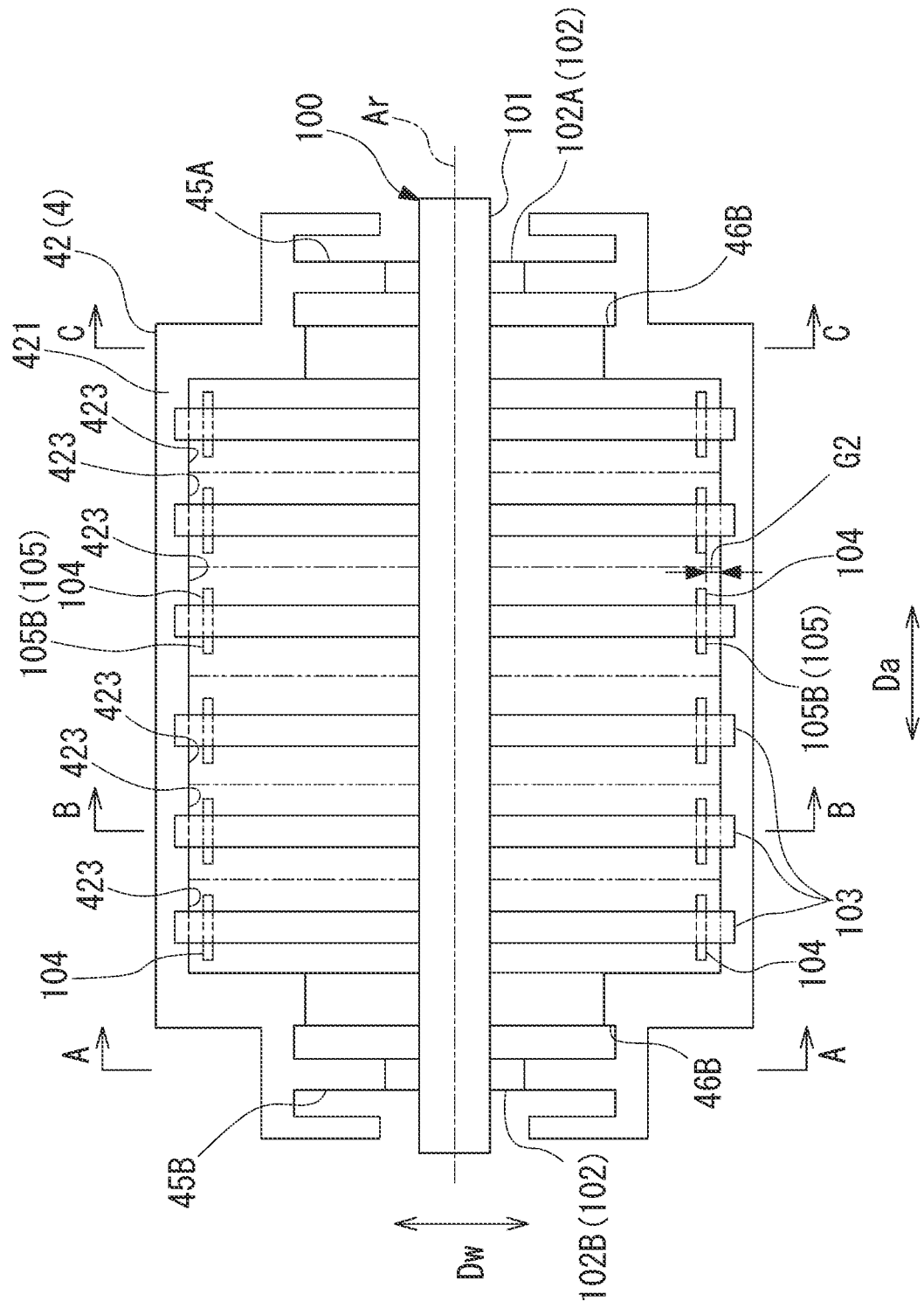
FIG. 3 is a plan view illustrating a state in which the measuring jig is installed in a lower half casing of the rotary machine.
Figure 4:
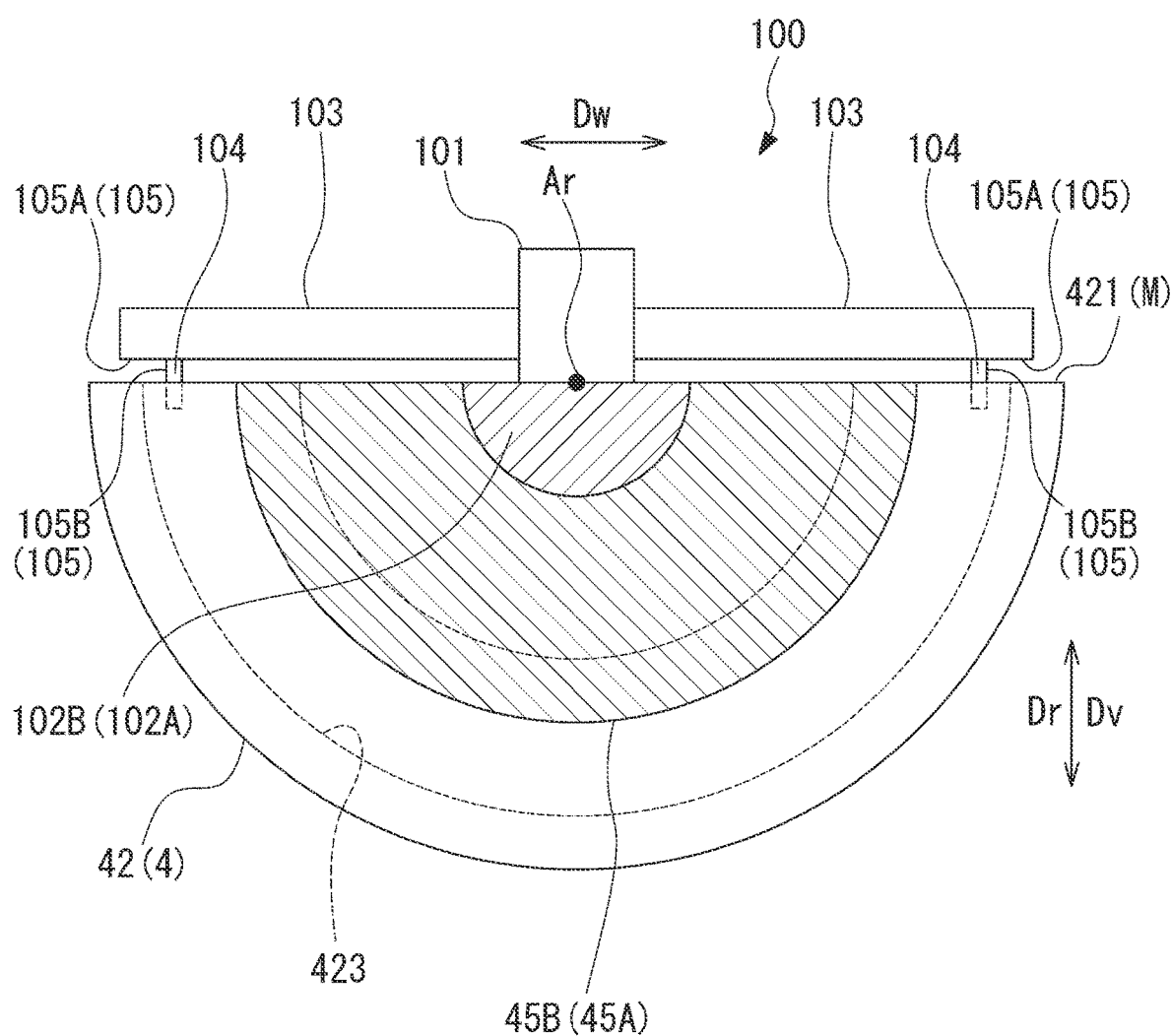
FIG. 4 is a sectional view taken along line A-A of FIG. 3.

As illustrated in FIGS. 3 and 4, the first casing fixing portion 102A is attachably and detachably fixed to the first lower bearing holding portion 45A. The first casing fixing portion 102A has a semicircular shape as viewed from the axial direction Da. The first casing fixing portion 102A is formed in a shape capable of being accommodated in the first lower bearing holding portion 45A. For example, the first casing fixing portion 102A is formed so as to have the same outer diameter as the lower half portion of the first bearing portion 51. The first casing fixing portion 102A is fitted into the first lower bearing holding portion 45A and thereby fixed in a state in which the movement of the first casing fixing portion 102A in the width direction Dw, downward in the radial direction Dr, and the axial direction Da with respect to the lower half casing 42 is restricted.

The second casing fixing portion 102B is detachably fixed to the second lower bearing holding portion 45B of the lower half casing 42. The second casing fixing portion 102B is disposed so as to be separated from the first casing fixing portion 102A in the axial direction Da. The second casing fixing portion 102B is formed in a shape capable of being accommodated in the second lower bearing holding portion 45B. For example, the second casing fixing portion 102B is formed so as to have the same outer diameter as the lower half portion of the first bearing portion 51. The second casing fixing portion 102B is fitted into the second lower bearing holding portion 45B and thereby fixed in a state in which the movement of the second casing fixing portion 102B in the width direction Dw, downward in the radial direction Dr, and the axial direction Da with respect to the lower half casing 42 is restricted.

Figure 2:
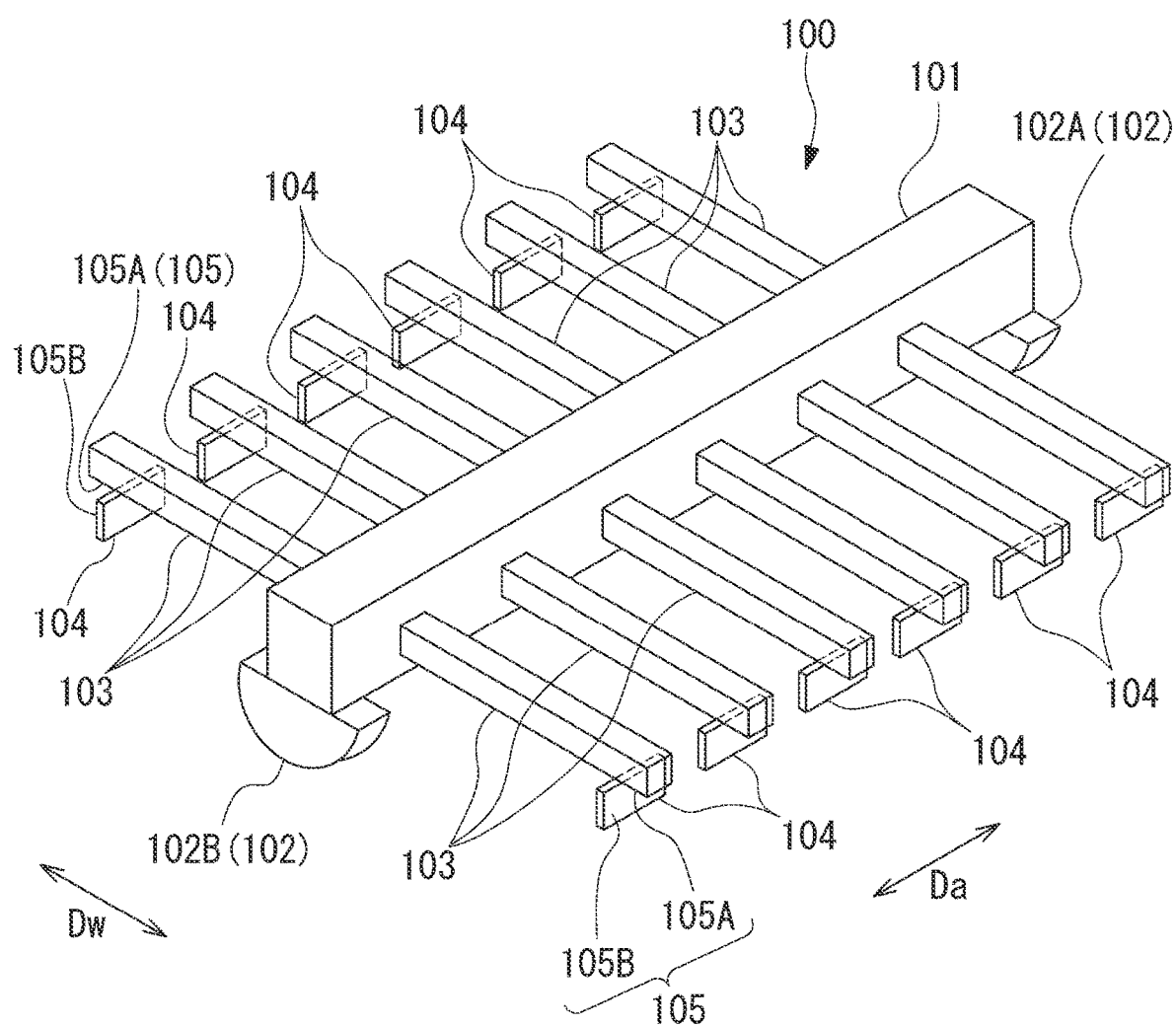
FIG. 2 is a perspective view illustrating the measuring jig.

As illustrated in FIG. 2, the main member 101 extends straight in the axial direction Da so as to connect the plurality of casing fixing portions 102 to each other. The cross-sectional shape of the main member 101 as viewed from the axial direction Da is, for example, rectangular, round, H-shaped, or the like. For example, H-shaped steel may be used for such a main member 101. The main member 101 has the first casing fixing portion 102A and the second casing fixing portion 102B such that the first casing fixing portion 102A and the second casing fixing portion 102B are disposed at both ends of the main member 101, respectively. In other words, the first casing fixing portion 102A and the second casing fixing portion 102B are connected to both end portions of the main member 101 in the axial direction Da. An upper end of the first casing fixing portion 102A and an upper end of the second casing fixing portion 102B are fixed to a lower surface of the main member 101 by welding, bolting, or the like. In this way, the main member 101 is supported from below by the first casing fixing portion 102A and the second casing fixing portion 102B. As illustrated in FIGS. 3 and 4, the main member 101 is formed so as to extend parallel to the axis Ar in a state in which the first casing fixing portion 102A and the second casing fixing portion 102B are attached to the first lower bearing holding portion 45A and the second lower bearing holding portion 45B.

As illustrated in FIGS. 2 and 3, each arm 103 extends from the main member 101 toward both sides in the width direction Dw orthogonal to the axial direction Da in the horizontal surface. That is, a plurality of arms 103 are disposed with two arms as a pair in the width direction Dw with respect to the main member 101. The pairs of arms 103 are disposed by the same number (same set) as the number of diaphragms 6 in the axial direction Da. The pair of arms 103 are disposed at positions corresponding to each diaphragm 6 such that a pair of arms is disposed for one diaphragm 6 in the axial direction Da. Each arm 103 is fixed to the main member 101 by welding, bolting, or the like. Each arm 103 extends straight in a state of being orthogonal to the main member 101. As illustrated in FIG. 4, each arm 103 is disposed with respect to the main member 101 so as to be located above the lower half divided surfaces 421 of the lower half casing 42 in the vertical direction Dv in a state in which the first casing fixing portion 102A and the second casing fixing portion 102B are attached to the first lower bearing holding portion 45A and the second lower bearing holding portion 45B.

Figure 5:
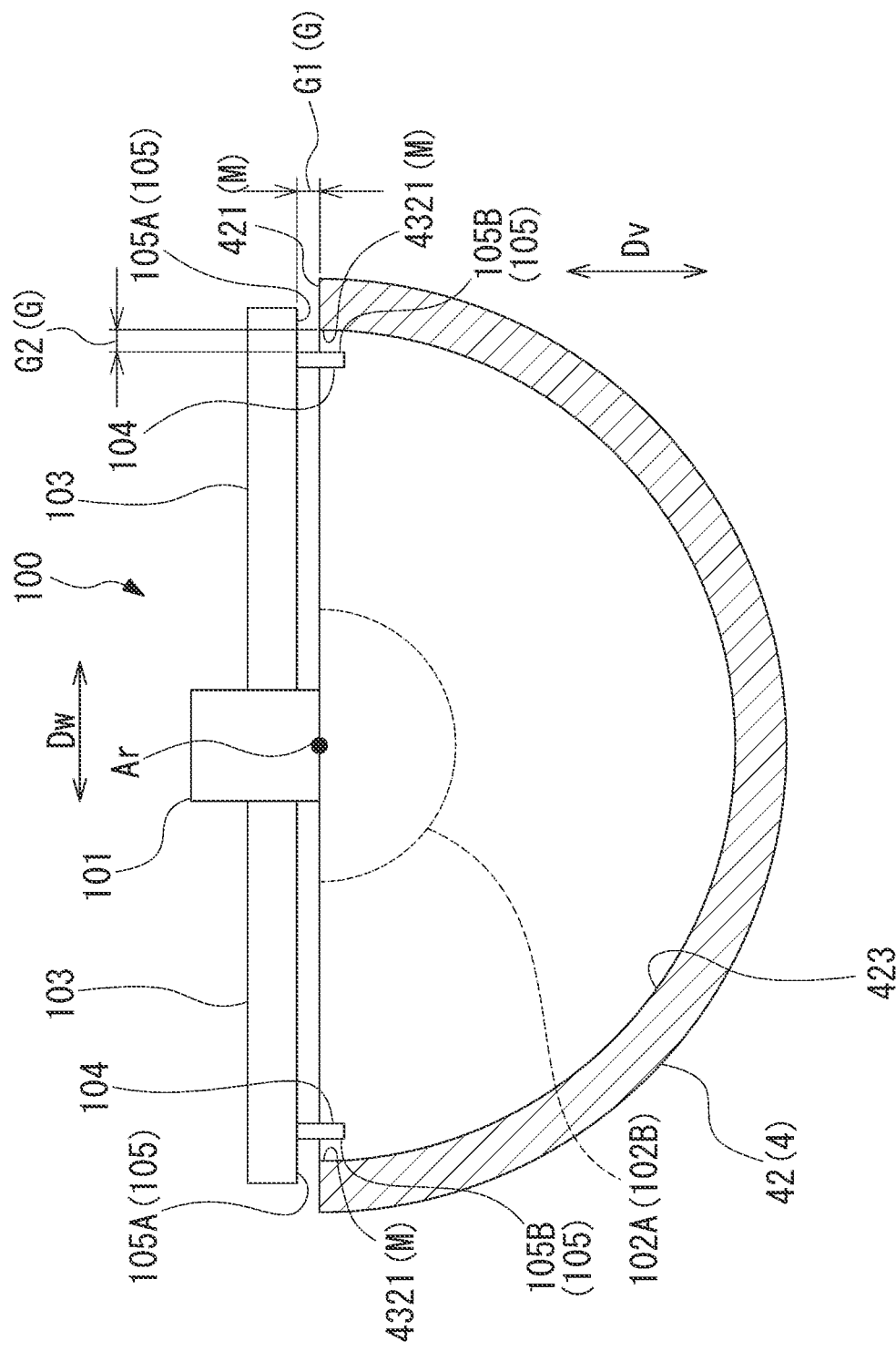
FIG. 5 is a sectional view taken along line B-B of FIG. 3.

Additionally, the measuring jig 100 has a plurality of reference surfaces 105 that are disposed at a distance from a measurement target part M of the casing 4. The reference surfaces 105 are measurement positions used when the casing 4 is measured with the measuring jig 100. As illustrated in FIGS. 4 and 5, in the present embodiment, the arm 103 has a first reference surface 105A as one of the reference surfaces 105. The first reference surface 105A is a reference for measuring the deformation of the measurement target part M of the casing 4 in the vertical direction Dv. The first reference surface 105A is formed on a lower surface of a tip portion of the arm 103. The first reference surface 105A is a flat surface having the lower half divided surface 421 of the lower half casing 42 as the measurement target part M. The first reference surface 105A is disposed so as to face the lower half divided surface 421 at a distance from the lower half divided surface 421 upward in the vertical direction Dv in a state in which the first casing fixing portion 102A and the second casing fixing portion 102B are attached to the first lower bearing holding portion 45A and the second lower bearing holding portion 45B. In such a first reference surface 105A, a gap G1 in the vertical direction Dv with respect to the lower half divided surface 421 is measured by a caliper, a scale, or the like, so that the displacement of the lower half divided surface 421 in the vertical direction Dv due to the deformation of the lower half casing 42 can be measured.

As illustrated in FIGS. 2 to 5, the measurement reference member 104 is fixed to the arm 103. The measurement reference member 104 is fixed to the arm 103 at a position closer to the main member 101 with respect to the first reference surface 105A. The measurement reference member 104 extends from the lower surface of the arm 103 so as to be orthogonal to the arm 103. The measurement reference member 104 extends to a position below the lower half divided surface 421 in the vertical direction Dv in a state in which the first casing fixing portion 102A and the second casing fixing portion 102B are attached to the first lower bearing holding portion 45A and the second lower bearing holding portion 45B. The measurement reference member 104 has a second reference surface 105B as a reference surface 105.

The second reference surface 105B is a reference for measuring the deformation of the measurement target part M of the casing 4 in the width direction Dw. The second reference surface 105B has an inner peripheral surface 4231 facing the inside (axis Ar side) in the width direction Dw as the measurement target part M in the lower half diaphragm holding portion 423 that holds an outer peripheral portion of the diaphragm 6 in the lower half casing 42. That is, the inner peripheral surface 4231 is a surface that forms a part of the lower half diaphragm holding portion 423. The second reference surface 105B faces the inner peripheral surface 4231 at an upper end portion of the lower half casing 42 connected to the lower half divided surface 421. The second reference surface 105B is a flat surface of the measurement reference member 104 that faces outward in the width direction Dw. The second reference surface 105B is disposed so as to face the inner peripheral surface 4231 at an interval above the inner peripheral surface 4231 in the width direction Dw in a state in which the first casing fixing portion 102A and the second casing fixing portion 102B are attached to the first lower bearing holding portion 45A and the second lower bearing holding portion 45B. In such a second reference surface 105B, a gap G2 in the width direction Dw with respect to the inner peripheral surface 4231 is measured by a caliper, a scale, or the like, so that the displacement of the lower half diaphragm holding portion 423 in the width direction Dw due to the deformation of the lower half casing 42 can be measured.

Figure 6:
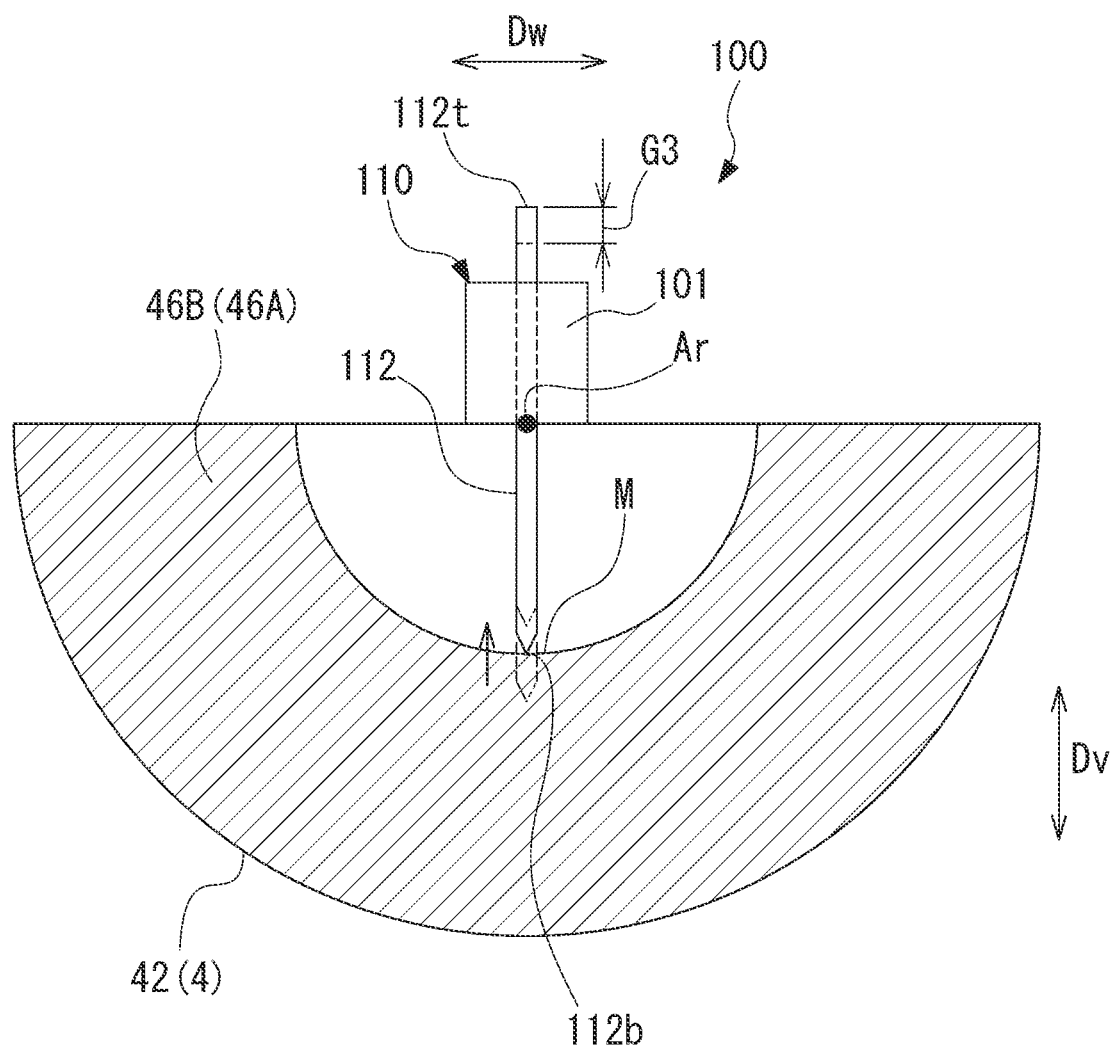
FIG. 6 is a sectional view taken along line C-C of FIG. 3.

Additionally, as illustrated in FIG. 6, the measuring jig 100 further includes a measuring tool 110. In the upper half casing 41 and the lower half casing 42, the measuring tool 110 has a portion located below the main member 101 in the vertical direction Dv as the measurement target part M. In the present embodiment, for example, in the first lower seal attachment portion 46A and the second lower seal attachment portion 46B, the measuring tool 110 has a bottom portion, which is the deepest position in the vertical direction Dv, as the measurement target part M. That is, the measuring tool 110 is disposed corresponding to each of the first lower seal attachment portion 46A and the second lower seal attachment portion 46B. The measuring tool 110 is capable of measuring the deformation, in the vertical direction Dv, of a reference portion when the seal portion 7 is fitted into the lower half casing 42.

The measuring tool 110 includes a stylus 112 that is movable relative to the main member 101 in the vertical direction Dv. The stylus 112 is formed in a rod shape that extends in the vertical direction Dv with respect to the main member 101. A tip 112b of the stylus 112 is allowed to abut against the bottom portions of the first lower seal attachment portion 46A and the second lower seal attachment portion 46B by moving relative to the main member 101. An upper end 1121 of the stylus 112 is allowed to protrude upward in the vertical direction from the main member 101 by moving relative to the main member 101. In the measuring tool 110, the tip 112b of the stylus 112 is brought into contact with the bottom portion of the lower half casing 42, so that the stylus 112 is pushed and an upper end 112t of the stylus 112 protrudes from the main member 101. In such a stylus 112, a movement dimension G3 in the vertical direction Dv from a reference position (the state before the upper end 112t moves with respect to the main member 101) is measured by a caliper, a scale, or the like, so that it is possible to measure the amounts of deformation in the vertical direction Dv at the bottom portion of the lower half casing 42.

(Procedure of Member Management Method for Rotary Machine)

Figure 7:
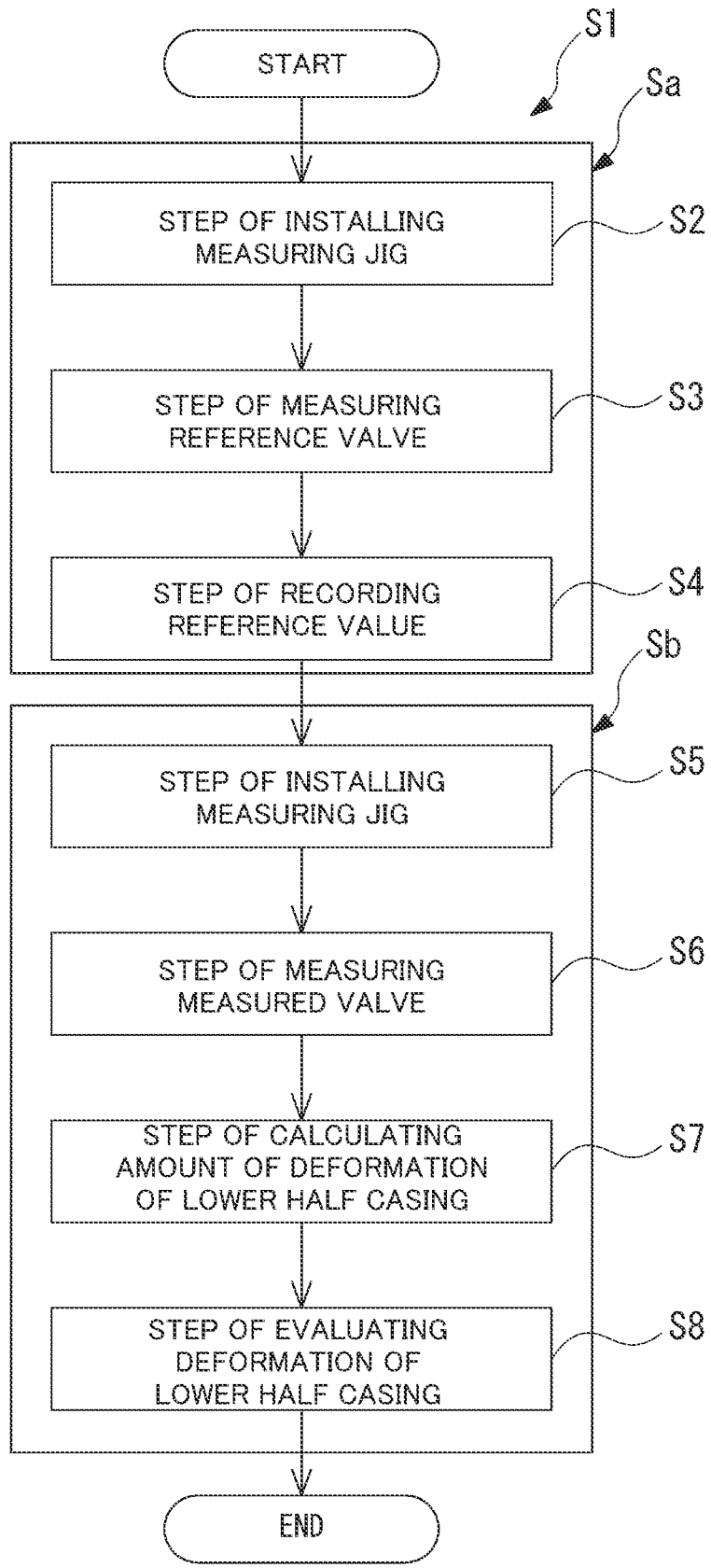
FIG. 7 is a flow chart illustrating a flow of the member management method for a rotary machine according to the present embodiment.

As illustrated in FIG. 7, in a member management method S1 for the rotary machine 1, the states of the upper half casing 41 and the lower half casing 42 are measured and evaluated. In the present embodiment, a case where the state of the lower half casing 42 is measured and evaluated will be described as an example, but the upper half casing 41 is also measured and evaluated by the same method. The member management method S1 for the rotary machine 1 according to the present embodiment includes an initial measurement step Sa and an in-maintenance measurement step Sb.

(Initial Measurement Step)

The initial measurement step Sa is carried out in a state in which the rotary machine 1 is newly installed at a predetermined installation position. That is, the initial measurement step Sa is carried out before the operation of the rotary machine 1. The initial measurement step Sa includes Step S2 of installing a measuring jig, Step S3 of measuring a reference value, and Step S4 of recording the reference value.

In Step S2 of installing the measuring jig, the measuring jig 100 is prepared. After that, the prepared measuring jig 100 is installed in the lower half casing 42 of the rotary machine 1. For this purpose, for example, as illustrated in FIG. 4, when the rotary machine 1 is assembled, the first casing fixing portion 102A and the second casing fixing portion 102B are fixed to the first lower bearing holding portion 45A and the second lower bearing holding portion 45B with respect to the lower half casing 42 in a single state in which nothing is disposed inside. In this state, as illustrated in FIG. 3, the main member 101 is disposed so as to extend parallel to the axis Ar. Additionally, in this state, each arm 103 is disposed at a predetermined position corresponding to each position of the lower half diaphragm holding portion 423 in the axial direction Da.

In Step S3 of measuring the reference value, gaps G between a plurality of the measurement target parts M of the casing 4 and the reference surfaces 105 and the movement dimension in the vertical direction Dv from the reference position of the stylus 112 are measured and acquired as reference values before the operation of the rotary machine 1. The reference value is a value indicating the position of the casing 4 with respect to the measuring jig 100 in a state in which the casing 4 is not deformed. Specifically, as illustrated in FIG. 5, in each arm 103, the gap G1 in the vertical direction Dv between the first reference surface 105A and the lower half divided surface 421 is measured with a caliper, a scale, or the like. Accordingly, the reference values of a plurality of the gaps G1 are acquired. Additionally, in each measurement reference member 104, the gap G2 in the width direction Dw between the second reference surface 105B and the inner peripheral surface 4231 is measured with a caliper, a scale, or the like. Accordingly, the reference values of a plurality of the gaps G2 are acquired. As illustrated in FIG. 6, in the measuring tool 110, the tip 112b of the stylus 112 abuts against the bottom portion of the lower half casing 42. In this state, the movement dimension G3 in the vertical direction Dv from the reference position of the upper end 112t of the stylus 112 is measured with a caliper, a scale, or the like. Accordingly, the reference value of the movement dimension G3 is acquired.

In Step S4 of recording the reference value, the gap G1, the gap G2, and the movement dimension G3 measured in Step S3 of measuring the reference value are recorded as reference values at the time of new installation before the operation of the rotary machine 1. The reference values may be manually recorded on recording paper or the like or may be recorded by storing the reference values in a computer device.

(In-Maintenance Measurement Step)

The in-maintenance measurement step Sb is carried out when the rotary machine 1 is maintained after the operation of the rotary machine 1 is started. The in-maintenance measurement step Sb includes Step S5 of installing a measuring jig, step S6 of measuring a measured value, Step S7 of calculating the amounts of deformation of the lower half casing, and Step S8 of evaluating the deformation of the lower half casing.

In Step S5 of installing the measuring jig, the measuring jig 100 is prepared. After that, the prepared measuring jig 100 is installed in the lower half casing 42 of the rotary machine 1. Specifically, internal members such as the upper half casing 41, the rotor 2, the bearing portion 5, the diaphragm 6, and the seal portion 7 are removed from the lower half casing 42. Accordingly, the lower half casing 42 is in a single state in which nothing is disposed inside. After that, the measuring jig 100 is installed in the lower half casing 42 so as to be in the same state (posture) as in Step S2 of installing the measuring jig. That is, as illustrated in FIG. 4, the first casing fixing portion 102A and the second casing fixing portion 102B are fixed to the first lower bearing holding portion 45A and the second lower bearing holding portion 45B. In this state, as illustrated in FIG. 3, the main member 101 is installed so as to extend parallel to the axis Ar. Additionally, in this state, each arm 103 is disposed at a predetermined position corresponding to each position of the lower half diaphragm holding portion 423 in the axial direction Da.

In Step S6 of measuring the measured value, the gap G between each measurement target part M in the casing 4 and each reference surface 105 of the measurement reference member 104 of the measuring jig 100, and the movement dimension in the vertical direction Dv from the reference position of the stylus 112 are measured and acquired as measured values after the operation of the rotary machine 1. The measured value is a value indicating the position of the casing 4 with respect to the measuring jig 100 in a state in which the casing 4 is deformed. In Step S6 of measuring the measured value, the measured value is measured by the same method as Step S3 of measuring the reference value. Specifically, as illustrated in FIG. 5, in each arm 103, the gap G1 in the vertical direction Dv between the first reference surface 105A and the lower half divided surface 421 is measured with a caliper, a scale, or the like. Accordingly, the measured values of the plurality of the gaps G1 are acquired. Additionally, in each measurement reference member 104, the gap G2 in the width direction Dw between the second reference surface 105B and the inner peripheral surface 4231 is measured with a caliper, a scale, or the like. Accordingly, the measured values of the plurality of gaps G2 are acquired. As illustrated in FIG. 6, in the measuring tool 110, the tip 112b of the stylus 112 abuts against the bottom portion of the lower half casing 42. In this state, the movement dimension G3 in the vertical direction Dv from the reference position of the upper end 112t of the stylus 112 is measured with a caliper, a scale, or the like. Accordingly, the measured value of the movement dimension G3 is acquired.

In Step S7 of calculating the amount of deformation of the lower half casing, differences for the respective measurement target parts M are calculated on the basis of the plurality of measured values (the gap G1, the gap G2, and the movement dimension (3) acquired in Step S6 of measuring the measured value and the reference values (the gap G1, the gap (G2, and the movement dimension G3) recorded in Step S4 of recording the reference value. The differences are the amounts of deformation at the respective measurement target parts M after the operation of the rotary machine 1. Therefore, in Step S7 of calculating the amounts of deformation of the lower half casing, the amounts of deformation at the measurement target parts M are acquired.

In Step S8 of evaluating the deformation of the lower half casing, the amounts of deformation of the respective measurement target parts M calculated in Step S7 of calculating the amounts of deformation of the lower half casing are evaluated. For this purpose, for example, it is determined whether or not the amounts of deformation of the respective measurement target parts M exceed an upper limit value such as a preset allowable amount of deformation.

If the amounts of deformation of the respective measurement target parts M do not exceed the upper limit value on the basis of evaluation results in Step S8 of evaluating the deformation of the lower half casing, the diaphragm 6, the seal portion 7, the hearing portion 5, the rotor 2, the upper half casing 41, and the like are assembled to the lower half casing 42 after maintenance. Additionally, in a case where the amounts of deformation of the measurement target parts M exceed the upper limit value in the evaluation results in Step S8 of evaluating the deformation of the lower half casing, the lower half casing 42 or parts of the bearing portion 5, the diaphragm 6, and the seal portion 7 are corrected by, for example, polishing or cutting. Additionally, members that fill gaps between the measurement target parts M and the internal members may be separately manufactured depending on the amounts of deformation in the measurement target parts M. After that, the diaphragm 6, the seal portion 7, the bearing portion 5, the rotor 2, and the upper half casing 41 are assembled to the lower half casing 42. Accordingly, the rotary machine 1 is brought into an operable state again.

(Operational Effects)

In the member management method S1 for the rotary machine 1 using the measuring jig 100 having the above configuration, by using the reference surface 105, the reference value of the gap G before the start of operation of the rotary machine 1 in the measurement target part M of the casing 4 and the measured value of the gap G after the start of the operation can be measured. That is, the gap G can be measured at the same position before and after the start of operation of the rotary machine 1. Accordingly, it is possible to grasp the displacement at the time when the measured value is measured with respect to the time when the reference value at the measurement target part M is measured. Therefore, the deformation of the casing 4 can be accurately and easily grasped. Accordingly, it is possible to accurately evaluate the amounts of deformation of the casing 4. Additionally, by using the grasped displacement of the measurement target parts M, it is possible to accurately repair the casing 4 and the members to be assembled to the casing 4. As a result, it is possible to suppress the influence of the deformation of the casing 4 and operate the rotary machine 1 while maintaining a stable state for a long period of time.

Additionally, the gap G1 between the first reference surface 105A and the lower half divided surface 421 can be measured by using the measuring jig 100. Accordingly, it is possible to grasp the displacement of the position, in the vertical direction Dv of an upper portion that is the vicinity of the lower half divided surface 421 of the lower half casing 42.

Additionally, the gap G2 between the second reference surface 105B and the inner peripheral surface 4231 of the lower half casing 42 facing the width direction Dw can be measured by using the measuring jig 100. Accordingly, the displacement of the position of the lower half casing 42 in the width direction Dw can be grasped.

Additionally, in the measuring jig 100, it is possible to measure the relative position of the stylus 112 in the vertical direction Dv with respect to the main member 101 in a state in which the stylus 112 is moved in the vertical direction Dv with respect to the main member 101 and the tip 112b of the stylus 112 abuts against the measurement target part M. Accordingly, the displacement of the bottom portion of the lower half casing 42 in the vertical direction Dv can be grasped.

Modification Example of Embodiment

Figure 8:
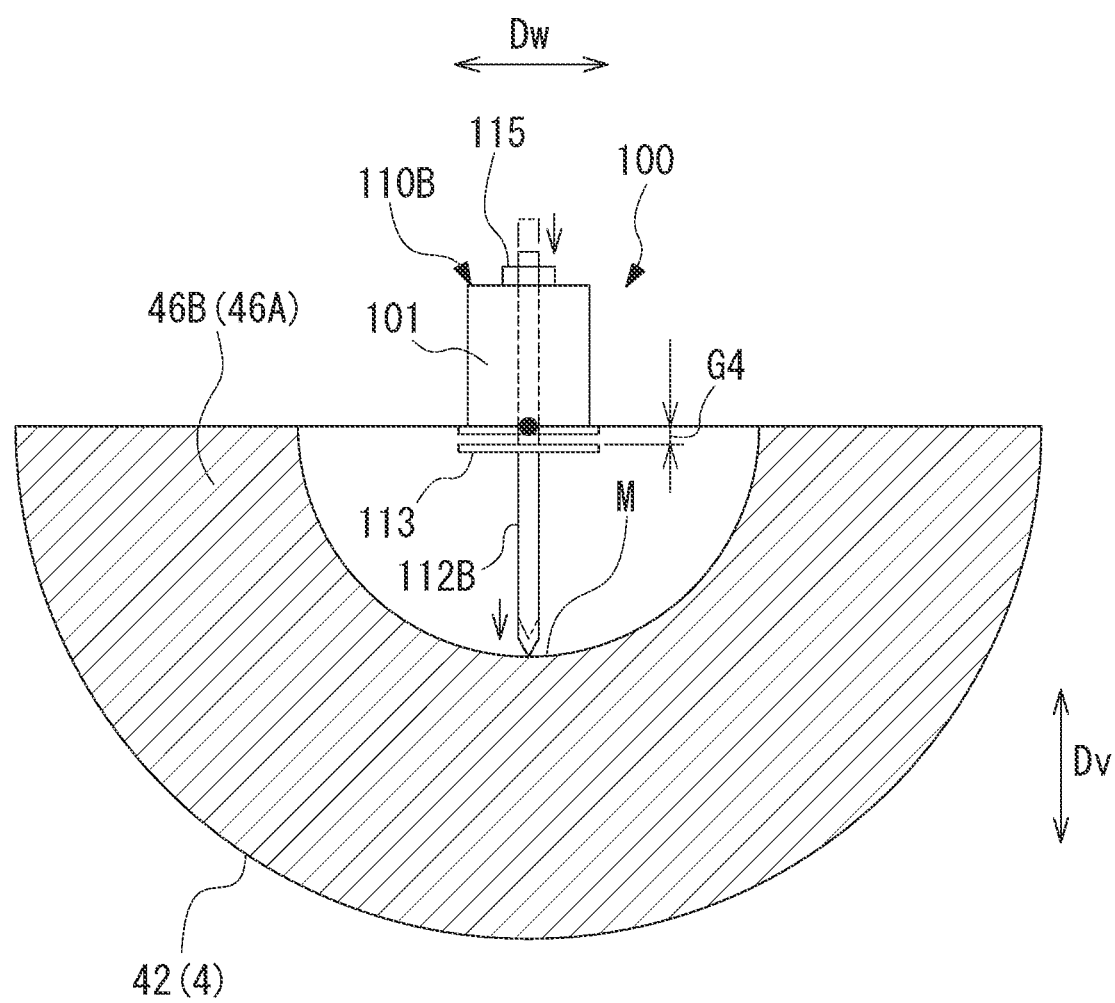
FIG. 8 is a view illustrating a modification example of a lower measuring tool provided in the measuring jig for a rotary machine according to the present embodiment.

In the above embodiment, the measuring tool 110 has a configuration in which the stylus 112 is movable relative to the main member 101 upward in the vertical direction Dv but is not limited to such a structure. For example, as illustrated in FIG. 8, in a measuring tool 110B, the stylus 112B may be movable relative to the main member 101 downward in the vertical direction Dv. In that case, the measuring tool 110B may include a base plate 113 that moves integrally with the stylus 112B. The base plate 113 is disposed below the main member 101 in the vertical direction Dv. The stylus 112B can be fixed after being moved with respect to the main member 101 downward in the vertical direction Dv by a screw member 115. The stylus 112B extends downward in the vertical direction Dv from a lower surface of the base plate 113 so as to penetrate the base plate 113.

In the measuring tool 110B having such a configuration, the base plate 113 can be lowered downward in the vertical direction Dv together with the stylus 112B. Then, the positions of the stylus 112B and the base plate 113 are fixed by the screw member 115 in a state in which the tip 112b of the stylus 112B abuts against the measurement target part M located at the bottom portion of the lower half casing 42. In this state, a gap G4 between the lower surface of the main member 101 and an upper surface of the base plate 113 is measured with a caliper, a scale, or the like. Accordingly, the displacement of the bottom portion of the lower half casing 42 in the vertical direction Dv can be grasped.

OTHER EMBODIMENTS

As described above, the embodiment of the present disclosure has been described in detail with reference to the drawings. However, the specific configuration is not limited to the embodiment, and also includes design changes and the like without departing from the scope of the present disclosure.

For example, although respective parts of the casing 4 (lower half casing 42) are provided as exemplary examples of the measurement target part M by the measuring jig 100, a part other than parts provided as an exemplary example above may be the measurement target part M.

Additionally, in the above embodiment, a steam turbine is an exemplary example of the rotary machine 1, but the rotary machine 1 may be, for example, a centrifugal compressor or the like in addition to a steam turbine.

Additionally, the measuring jig used for the measurement of the upper half casing 41 may be the same as the measuring jig 100 used for the measurement of the lower half casing 42 as described in the present embodiment or may be another one that matches the shape of the upper half casing 41.

Additionally, such a measuring tool 110 is not limited to having the bottom portions of the first lower seal attachment portion 46A and the second lower seal attachment portion 46B as the measurement target parts M. That is, the measuring tool 110 is not limited to a structure in which the deformation, in the vertical direction Dv, of the reference portion when the seal portion 7 is fitted into the lower half casing 42. In the measuring tool 110, for example, a bottom portion of the lower half diaphragm holding portion 423 that holds an outer peripheral portion of the diaphragm 6 in the lower half casing 42 may be the measurement target part M. Additionally, in the measuring tool 110, the bottom portions of the first lower bearing holding portion 45A and the second lower bearing holding portion 45B, which serve as references when the bearing portion 5 is fitted into the lower half casing 42, may be the measurement target part M.

<Appendix>

The measuring jig 100 for the rotary machine 1 and the member management method S1 for the rotary machine 1 according to the embodiment are grasped as follows, for example.

(1) The measuring jig 100 for the rotary machine 1 according to a first aspect is a measuring jig 100 for a rotary machine 1 including a casing 4 that extending about an axis Ar, a rotor 2 that is disposed in the casing 4 and extends in an axial direction Da about the axis Ar, and a plurality of bearings 53A and 53B that are disposed at intervals in the axial direction Da and capable of supporting the rotor 2 in the casing 4, the measuring jig including a plurality of casing fixing portions 102 that are configured to be respectively attachable to and detachable from hearing holding portions 43A and 43B to which the plurality of bearings 53A and 53B are attached in the casing 4; a main member 101 that extends in the axial direction Da so as to connect the plurality of casing fixing portions 102 to each other; an arm 103 that extends from the main member 101 in an orthogonal direction orthogonal to the axial direction Da; and a reference surface 105 that is disposed at a distance from a measurement target part M of the casing 4.

Examples of the rotary machine 1 include a steam turbine and a centrifugal compressor.

In the measuring jig 100 for the rotary machine 1, by using the reference surface 105, the reference value of the gap G before the start of operation of the rotary machine 1 in the measurement target part M of the casing 4 and the measured value of the gap G after the start of the operation can be measured. That is, the gap G can be measured at the same position before and after the start of operation of the rotary machine 1. Accordingly, it is possible to grasp the displacement at the time when the measured value is measured with respect to the time when the reference value is measured at the measurement target part M. Therefore, the deformation of the casing 4 can be accurately and easily grasped.

(2) The measuring jig 100 for the rotary machine 1 according to a second aspect may be the measuring jig 100 for the rotary machine 1 of (1) in which the casing 4 has an upper half casing 41 and a lower half casing 42 that are disposed so as to face each other in a vertical direction Dv and each has a divided surface that is a horizontal surface, and the reference surface 105 has a first reference surface 105A that is disposed at a distance upward in the vertical direction Dv from the divided surface in at least one of the upper half casing 41 and the lower half casing 42 when the plurality of casing fixing portions 102 are attached to the bearing holding portions 43A and 43B.

Accordingly, the displacement of the position, in the vertical direction Dv, of the upper portion that is the vicinity of the divided surface of the upper half casing 41 or the lower half casing 42 can be grasped by using the measuring jig 100.

(3) The measuring jig 100 for the rotary machine 1 according to a third aspect may be the measuring jig 100 for the rotary machine 1 of (1) or (2) in which the casing 4 has an upper half casing 41 and a lower half casing 42 that are disposed so as to face each other in a vertical direction Dv and each has a divided surface that is a horizontal surface, and the reference surface 105 has a second reference surface 105B that is disposed at a distance in the orthogonal direction from an inner peripheral surface facing the orthogonal direction in at least one of the upper half casing 41 and the lower half casing 42 when the plurality of casing fixing portions 102 are attached to the bearing holding portions 43A and 43B.

Accordingly, by measuring the gap G2 between the second reference surface 105B and the inner peripheral surface 4231 of the lower half casing 42 facing the horizontal direction by using the measuring jig 100, it is possible to grasp the displacement of the position of the inner peripheral surface 4231 of the lower half casing 42 facing the horizontal direction.

(4) The measuring jig 100 for the rotary machine 1 according to a fourth aspect may be the measuring jig 100 for the rotary machine 1 of (3) in which the rotary machine 1 further includes a diaphragm 6 that is disposed in the casing 4 in a state in which an impeller 22 extending outward in a radial direction Dr with respect to the axis Ar in the rotor 2 is accommodated therein, and the inner peripheral surface is a part of a diaphragm holding portion 413 or 423 that is configured to hold an outer peripheral portion of the diaphragm 6.

Accordingly, the displacement of the position of the lower half diaphragm holding portion 423 of the lower half casing 42 in the horizontal direction can be grasped by using the measuring jig 100.

(5) The measuring jig 100 for the rotary machine 1 according to a fifth aspect may be the measuring jig 100 for the rotary machine 1 of any one of (1) to (4) further including a stylus 112 that extends in the vertical direction Dv from the main member 101 and is movable relative to the main member 101 in the vertical direction Dv.

Accordingly, it is possible to measure the relative position of the stylus 112 in the vertical direction Dv with respect to the main member 101 in a state in which the stylus 112 is moved in the vertical direction Dv with respect to the main member 101 and the tip 112b of the stylus 112 abuts against the measurement target part M. Accordingly, it is possible to grasp the displacement of the bottom portion of the upper half casing 41 or the lower half casing 42 in the vertical direction Dv.

(6) The member management method S1 for the rotary machine 1 according to a sixth aspect is a member management method S1 using the measuring jig 100 for the rotary machine 1 of any one of (1) to (5), the member management method including a step S3 of measuring a distance between the measurement target part M and the reference surface 105 as a reference value after installing the measuring jig 100 in the casing 4; a step S4 of recording the measured reference value; a step S6 of measuring a distance between the measurement target part M and the reference surface 105 as a measured value and installing the measuring jig 100 in the casing 4 after the step of recording the reference value; and a step S8 of evaluating deformation of the casing 4 on the basis of a difference between the measured value and the reference value.

Accordingly, by using the reference surface 105, the reference value of the gap G before the start of operation of the rotary machine 1 in the measurement target part M of the casing 4 and the measured value of the gap G after the start of the operation can be measured. That is, the gap G can be measured at the same position before and after the start of operation of the rotary machine 1. Accordingly, it is possible to grasp the displacement at the time when the measured value is measured with respect to the time when the reference value is measured at the measurement target part M. Therefore, the deformation of the casing 4 can be accurately and easily grasped. Accordingly, the deformation of the casing 4 can be accurately evaluated. Additionally, by using the grasped displacement of the measurement target parts M, it is possible to accurately repair the casing 4 and the members to be assembled to the casing 4. As a result, it is possible to suppress the influence of the deformation of the casing 4 and operate the rotary machine 1 while maintaining a stable state for a long period of time.

EXPLANATION OF REFERENCES

1 . . . Rotary machine
2 . . . Rotor
4 . . . Casing
5 . . . Bearing portion
6 . . . Diaphragm
7 . . . Seal portion
7A . . . First seal portion
7B . . . Second seal portion
21 . . . Rotor body
21a . . . First end
21b . . . Second end
22 . . . Impeller
41 . . . Upper half casing
42 . . . Lower half casing
421 . . . Lower half divided surface
413 . . . Upper half diaphragm holding portion
423 . . . Lower half diaphragm holding portion
4231 . . . Inner peripheral surface
43A . . . First upper bearing holding portion (bearing holding portion)
43B . . . Second upper bearing holding portion (bearing holding portion)
44A . . . First upper seal attachment portion
44B . . . Second upper seal attachment portion
45A . . . First lower bearing holding portion
45B . . . Second lower bearing holding portion
46A . . . First lower seal attachment portion
46B . . . Second lower seal attachment portion
47 . . . Suction port
48 . . . Discharge port
51 . . . First bearing portion
52 . . . Second bearing portion
53A, 53B . . . Journal bearing
54 . . . Thrust bearing
71 . . . Support ring
72 . . . Seal member
100 . . . Measuring jig
101 . . . Main member
102 . . . Casing fixing portion
102A . . . First casing fixing portion
102B . . . Second casing fixing portion
103 . . . Arm
104 . . . Measurement reference member
105 . . . Reference surface
105A . . . First reference surface
105B . . . Second reference surface
110, 110B . . . Measuring tool
112, 112B . . . Stylus
112b . . . Tip
112t . . . Upper end
113 . . . Base plate
115 . . . Screw member
Ar . . . Axis
Da . . . Axial direction
Dc . . . Circumferential direction
Dr . . . Radial direction
Dv . . . Vertical direction
Dw . . . Width direction (horizontal direction)
G, G1, G2, G4 . . . Gap
G3 . . . Movement dimension
M . . . Measurement target part
S1 . . . Member management method
S2 . . . Step of installing measuring jig
S3 . . . Step of measuring reference value
S4 . . . Step of recording reference value
S5 . . . Step of installing measuring jig
S6 . . . Step of measuring measured value
S7 . . . Step of calculating amount of deformation of lower half casing
S8 . . . Step of evaluating deformation of lower half casing
Sa . . . Initial measurement step
Sb . . . In-maintenance measurement step

What is claimed is:

1. A measuring jig for a rotary machine that comprises a casing extending around an axis of the rotary machine, a rotor that is disposed in the casing and extends in an axial direction of the rotary machine around the axis, and bearings that are disposed at intervals in the axial direction and support the rotor in the casing, the measuring jig comprising:
casing fixing portions that are respectively attachable to and detachable from bearing holding portions of the casing that are attached to the bearings in the casing;
a main member that extends in the axial direction and connects the casing fixing portions;
an arm that extends from the main member in an orthogonal direction orthogonal to the axial direction; and
a reference surface that is disposed at a distance from a measurement target part of the casing,
wherein the casing comprises:
an upper half casing; and
a lower half casing that faces the upper half casing in a vertical direction at a divided surface that is a horizontal surface,
wherein each of the casing fixing portions is configured to be accommodated in each of the bearing holding portions, and
wherein each of the casing fixing portions is fitted into each of the bearing holding portions and thereby fixed in a state in which movement of each of the casing fixing portions is restricted with respect to the lower half casing or the upper half casing:
in a width direction that is one of radial directions of the rotary machine and is orthogonal to the vertical direction,
downward in the vertical direction, and
in the axial direction.

2. The measuring jig according to claim 1,
wherein the reference surface is disposed at a distance upward in the vertical direction from the divided surface in at least one of the upper half casing and the lower half casing when the casing fixing portions are attached to the bearing holding portions.

3. The measuring jig according to claim 1,
wherein the reference surface is disposed at a distance in the orthogonal direction from an inner peripheral surface facing the orthogonal direction in at least one of the upper half casing and the lower half casing when the casing fixing portions are attached to the bearing holding portions.

4. The measuring jig according to claim 3,
wherein the rotary machine further comprises a diaphragm that is disposed in the casing in a state in which an impeller extending outward in the radial direction is accommodated therein, and wherein the inner peripheral surface is a part of a diaphragm holding portion that holds an outer peripheral portion of the diaphragm.

5. The measuring jig according to claim 1, further comprising:
a stylus that extends in the vertical direction from the main member and is movable relative to the main member in the vertical direction.

6. A member management method for a rotary machine using the measuring jig according to claim 1, the member management method comprising:
a step of measuring a distance between the measurement target part and the reference surface as a measured reference value after installing the measuring jig in the casing;
a step of recording the measured reference value;
a step of measuring a distance between the measurement target part and the reference surface as a measured value and installing the measuring jig in the casing after the step of recording the measured reference value; and
a step of evaluating deformation of the casing based on a difference between the measured value and the measured reference value.

\* \* \* \* \*